(12) United States Patent
Savio et al.

(10) Patent No.: US 11,879,499 B2
(45) Date of Patent: Jan. 23, 2024

(54) TRANSMISSION SHAFT ASSEMBLY, TRANSMISSION SHAFT AND ASSOCIATED METHOD

(71) Applicant: Regal Beloit America, Inc., Beloit, WI (US)

(72) Inventors: Adriano Savio, Milan (IT); Marcos Louredo Casado, Guipúzcoa (ES); Koldo Puyadena, Guipúzcoa (ES)

(73) Assignee: Regal Beloit America, Inc., Beloit, WI (US)

( * ) Notice: Subject to any disclaimer, the term of this patent is extended or adjusted under 35 U.S.C. 154(b) by 1250 days.

(21) Appl. No.: 16/039,425

(22) Filed: Jul. 19, 2018

(65) Prior Publication Data
US 2019/0022723 A1    Jan. 24, 2019

(30) Foreign Application Priority Data
Jul. 20, 2017   (EP) ...................................... 17182456

(51) Int. Cl.
*F16C 3/02*          (2006.01)
*F16N 1/00*          (2006.01)
(Continued)

(52) U.S. Cl.
CPC ................. *F16C 3/02* (2013.01); *F16N 1/00* (2013.01); *F16N 25/04* (2013.01); *B21B 35/147* (2013.01); *F16D 2300/06* (2013.01)

(58) Field of Classification Search
CPC . B21B 27/08; B21B 35/147; B21B 2027/083; F16C 1/24; F16C 3/02; F16C 3/023; F16C 3/03; F16C 3/035; F16C 3/14; F16C 3/16; F16D 3/06; F16D 3/065; F16D 3/185; F16D 2300/0214; F16D 2300/06; F16H 57/042; F16N 1/00; F16N 7/18; F16N 9/02; F16N 25/04
(Continued)

(56) References Cited

U.S. PATENT DOCUMENTS 1,404,538 A * 1/1922 Mitchell .................. F16C 3/16
                                                   384/316
1,545,628 A * 7/1925 Wolk ........................ F16D 3/16
                                                   464/7
(Continued)

FOREIGN PATENT DOCUMENTS

CN        102597555 A     7/2012
CN        202427711 U     9/2012
(Continued)

*Primary Examiner* — Josh Skroupa
(74) *Attorney, Agent, or Firm* — Armstrong Teasdale LLP

(57) ABSTRACT

A transmission shaft assembly for a rolling stand for use in a metal rolling mill. The transmission shaft assembly transmits lubricant through the assembly. The transmission shaft assembly includes a shaft having an outer periphery and defining a centrally positioned longitudinal opening extending from a first end to an opposed second end of the shaft. The shaft defines a plurality of internal passageways in the shaft. The transmission shaft assembly also includes a rotary distributor mounted on the outer periphery of the shaft. The shaft assembly provides a conduit for the lubricant through the plurality of internal passageways in the shaft.

16 Claims, 14 Drawing Sheets

(51) Int. Cl.
  *F16N 25/04*   (2006.01)
  *B21B 35/04*   (2006.01)
  *B21B 35/14*   (2006.01)

(58) Field of Classification Search
  USPC .................................. 464/7, 16; 184/7.1, 31
  See application file for complete search history.

(56) References Cited

U.S. PATENT DOCUMENTS

| | | | | |
|---|---|---|---|---|
| 2,077,880 A | * | 4/1937 | Gits | F16N 9/02 |
| | | | | 384/415 |
| 2,925,885 A | * | 2/1960 | White | B21B 35/147 |
| | | | | 184/6 |
| 3,045,453 A | * | 7/1962 | Shenk | F16D 3/185 |
| | | | | 464/16 |
| 3,443,399 A | * | 5/1969 | Pope | B24B 15/00 |
| | | | | 464/7 |
| 4,176,540 A | * | 12/1979 | Barber | F16D 3/185 |
| | | | | 72/236 |
| 4,990,121 A | * | 2/1991 | Vosbeck | F16D 3/185 |
| | | | | 464/16 |
| 5,071,390 A | * | 12/1991 | Latshaw | F16D 25/12 |
| | | | | 464/7 |
| 5,979,207 A | * | 11/1999 | Seidl | F16D 3/185 |
| | | | | 464/16 |
| 6,223,859 B1 | * | 5/2001 | Lindenthal | F16C 3/03 |
| | | | | 184/7.4 |
| 7,117,976 B2 | * | 10/2006 | Rowe | F16N 9/02 |
| | | | | 184/6.28 |
| 8,556,733 B2 | * | 10/2013 | Starbatty | F16C 3/03 |
| | | | | 464/17 |
| 8,579,512 B2 | * | 11/2013 | Radinger | F16C 33/66 |
| | | | | 384/473 |
| 8,677,850 B2 | * | 3/2014 | Smith, II | F16D 3/185 |
| | | | | 184/7.1 |
| 9,004,890 B2 | * | 4/2015 | Tomzik | F04C 2/086 |
| | | | | 464/7 |
| 9,227,234 B2 | * | 1/2016 | Grimmel | F16D 3/185 |
| 2006/0108102 A1 | | 5/2006 | Springmann et al. | |

FOREIGN PATENT DOCUMENTS

| | | | | | |
|---|---|---|---|---|---|
| CN | 103499942 A | | 1/2014 | | |
| CN | 104039470 A | | 9/2014 | | |
| CN | 104942008 A | | 9/2015 | | |
| CN | 105121046 A | | 12/2015 | | |
| DE | 970245 C | * | 8/1958 | ........... | B21B 35/147 |
| EP | 1125656 A2 | | 8/2001 | | |
| FR | 358904 A | * | 3/1906 | ............... | F16N 7/18 |
| GB | 1263898 A | * | 2/1972 | ........... | B21B 35/147 |
| JP | 55149426 A | * | 11/1980 | ............. | B21B 35/147 |
| WO | 2013053507 A1 | | 4/2013 | | |

* cited by examiner

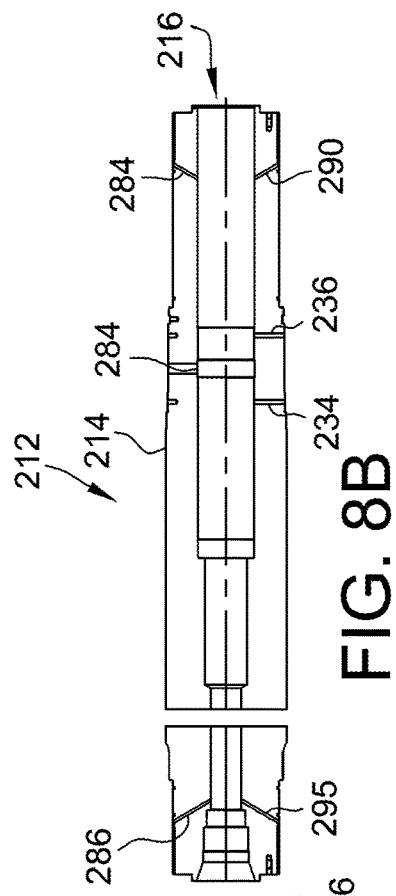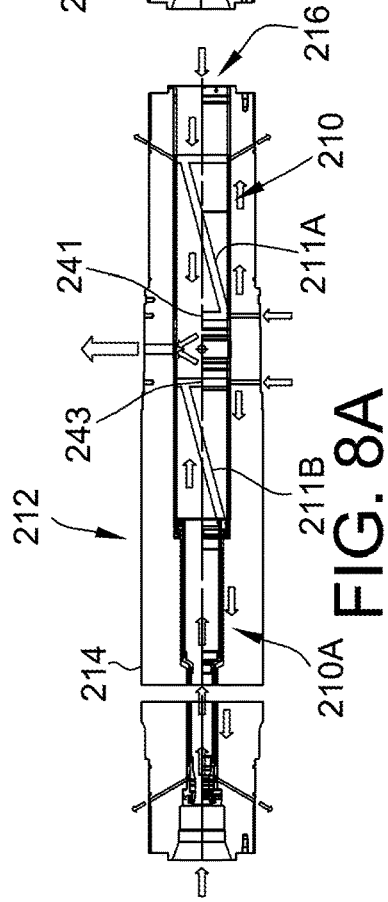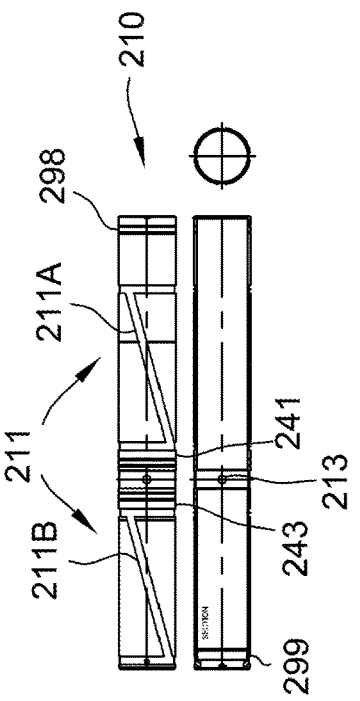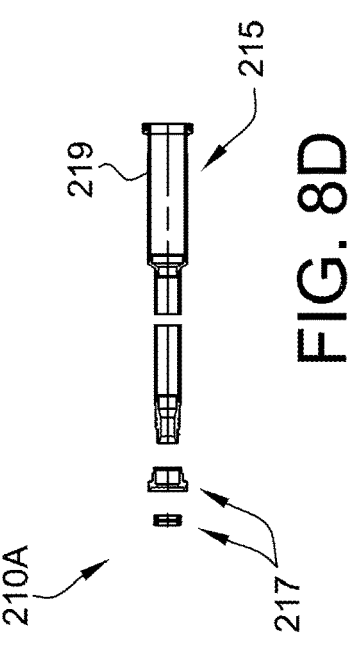
FIG. 8A
FIG. 8B
FIG. 8C
FIG. 8D

TRANSMISSION SHAFT ASSEMBLY, TRANSMISSION SHAFT AND ASSOCIATED METHOD

CROSS REFERENCE TO RELATED APPLICATIONS

The present application claims priority to an earlier filed EPO application number EP17182456 filed Jul. 20, 2017, the entire disclosure of which is hereby expressly incorporated herein by reference.

BACKGROUND OF THE INVENTION

The embodiments described herein relate generally to a rolling stand for use in a metal rolling mill, and more specifically, to a transmission shaft assembly and method associated with the shaft assembly.

The rolling process consists of passing a hot steel billet through a "rolling mill", also called a "rolling train". The modern rolling train consists of multiple rolling stands arranged in an in-line configuration. Each rolling stand consists of a top and a bottom roll, driven through a gearbox by an electric motor. The rolls of the stands have contours or "grooves" machined into the rolls, so that the hot billet passing between the grooves is reduced in size and shaped by each subsequent stand. Typical motor sizes for modern mills is 600 kW to 1200 kW for each stand. Typically, 15 to 21 stands are used depending on the size of the feed billet and the finished product. Finishing speeds of 10-15 m/sec. are common today.

The tension between each stand must be accurately controlled, as the slightest change in tension will affect the shape of the product. Additionally, as the billet head end enters each subsequent rolling stand, the speed drop must recover very fast, so as not affect the tension control.

As the hot billet passes through the rolling train it is shaped, reduced in size, and lengthened by the mill stands. The product is then transferred to a walking beam cooling bed (typically 60-90 m long), via a high-speed transfer system (braking slide/aprons). Shears in the rolling train make head and tail crops, as well as divide the material to fit the cooling bed.

As stated above, each rolling stand consists of a top and a bottom roll, driven through a gearbox by an electric motor. Typically, a double universal joint drive shaft transfers the rotational energy from the gearboxes to the top and bottom rolls. The drive shaft separates the gearbox and the electric motor from the intense heat of the billet passing between the rolls.

Each of the rolls has rolling element bearings typically spherical roller bearings that need to be lubricated and that are subject to intense heat from the billet.

Continuous oil-lubricated spindles offer users a reliable way to continuously remove damaging heat from spindles while in operation. Because the oil flows on a regular basis, the need to maintain grease levels and to clean up environmentally unfriendly grease are eliminated. The oil lubrication concept significantly extends the life of spindle operations and reduces mill downtime.

Clean, temperature-regulated oil from the rolling mill's lubrication system (or from their own lubrication system) is introduced into the spindle from the driven end and transferred to the roll side. The oil is circulated through the roll-side geared elements and is transferred back from the roll side to an oil-collecting hood mounted at the driven side. The heated oil is then transferred back to the rolling mill's oil circulating system for cooling and cleaning.

An oil-collecting hood that is mounted at the driven side usually generates a lot of maintenance problems, increasing downtimes and complicates the overall maintenance operation because it is such a big and complex box, as well as, increasing the final cost of the continuously oil lubricating gear spindle.

BRIEF DESCRIPTION OF THE INVENTION

According to an embodiment of the present invention, a transmission shaft assembly for a rolling stand for use in a metal rolling mill is provided. The transmission shaft assembly transmits lubricant through the assembly. The transmission shaft assembly includes a shaft having an outer periphery and defining a centrally positioned longitudinal opening extending from a first end to an opposed second end of the shaft. The shaft defines a plurality of internal passageways in the shaft. The transmission shaft assembly also includes a rotary distributor mounted on the outer periphery of the shaft. The shaft assembly provides a conduit for the lubricant through the plurality of internal passageways in the shaft.

According to another embodiment of the present invention, the transmission shaft assembly may be configured such that the rotary distributor includes first and second inputs for inputting lubricant into the distributor and an output for outputting lubricant from the distributor.

According to yet another embodiment of the present invention, the transmission shaft assembly may be configured such that the rotary distributor includes first and second seals. The seals are axially spaced apart from each other and seal the rotary distributor to the outer periphery of said shaft.

According to yet another embodiment of the present invention, the transmission shaft assembly may be configured such that the seals are lip seals.

According to yet another embodiment of the present invention, the transmission shaft assembly may be configured such that the plurality of internal passageways includes a plurality of radially extending passageways and a plurality of axially extending passageways.

According to yet another embodiment of the present invention, the transmission shaft assembly may be configured such that the plurality of internal passageways includes at least one passageway that extends simultaneously radially and axially.

According to yet another embodiment of the present invention, the transmission shaft assembly may be configured such that the shaft includes a body portion defining an inner periphery of the body portion and a sleeve including an outer periphery of the sleeve fitted to the inner periphery of the body portion.

According to yet another embodiment of the present invention, the transmission shaft assembly may be configured such that the inner periphery of the body portion and the outer periphery of the sleeve defining a passageway between each other.

According to yet another embodiment of the present invention, the transmission shaft assembly may be configured such that the passageway between the inner periphery of the body portion and the outer periphery of the sleeve is an axially extending passageway.

According to yet another embodiment of the present invention, the transmission shaft assembly may be configured such that at least a portion of the passageway between the inner periphery of the body portion and the outer periphery of the sleeve is a helical passageway.

According to yet another embodiment of the present invention, a transmission shaft for a rolling stand for use in a metal rolling mill is provided. The transmission shaft includes a body having a generally cylindrical outer periphery and defining a centrally positioned longitudinal opening extending from a first end to an opposed second end of the shaft. The body further defines a plurality of internal passageways in the body.

According to yet another embodiment of the present invention, the transmission shaft may be configured such that the plurality of internal passageways includes a plurality of radially extending passageways and a plurality of axially extending passageways.

According to yet another embodiment of the present invention, the transmission shaft may be configured such that the body defines an inner periphery of the body. The shaft may also include a sleeve having an outer periphery of the sleeve fitted to the inner periphery of the body.

According to yet another embodiment of the present invention, the transmission shaft may be configured such that the body and the sleeve define a passageway between the body and the sleeve.

According to yet another embodiment of the present invention, the transmission shaft may be configured such that the passageway between the inner periphery of the body portion and the outer periphery of the sleeve is an axially extending passageway.

According to yet another embodiment of the present invention, the transmission shaft may be configured such that at least a portion of the passageway between the inner periphery of the body portion and the outer periphery of the sleeve is a helical passageway.

According to yet another embodiment of the present invention, a method for providing lubrication to a transmission shaft in a rolling mill machine is provided. The method includes the steps of providing a transmission shaft having a central opening extending to the opposed ends of the shaft and internal passageways extending inwardly from the outer periphery of the shaft; providing a rotary distributor, fitting the distributor over the outer periphery of the shaft, inputting lubricant into the rotary distributor, passing lubricant from the distributor to the internal passageways of the shaft, and advancing the lubricant from the internal passageways of the shaft to the opposed ends of the shaft.

According to yet another embodiment of the present invention, the method may be provided such that the method further includes the step of inserting a sleeve into the central opening of the shaft.

According to yet another embodiment of the present invention, the method may be provided such that the method further includes the step of providing a passageway between the sleeve and the body and wherein the step of advancing the lubricant from the internal passageways of the shaft to the opposed ends of the shaft includes advancing the lubricant along the passageway between the sleeve and the body.

According to yet another embodiment of the present invention, the method may be provided such that the step of providing a passageway between the sleeve and the body includes providing a helical passageway between the sleeve and the body.

BRIEF DESCRIPTION OF THE DRAWINGS

FIG. 8A is a cross sectional view of another embodiment of the present invention in the form of transmission shaft assembly having sleeves with helical oil passageways formed in the outer periphery of the sleeves;

FIG. 8B is a cross sectional view of the transmission shaft of the transmission shaft assembly of FIG. 8A, showing the radial holes for connecting to the oil passageways;

FIG. 8C includes plan, end and cross sectional views of a first sleeve used in the transmission shaft assembly of FIG. 8A;

FIG. 8D is an exploded cross sectional view of a second sleeve and other sleeves used in the transmission shaft assembly of FIG. 8A;

DETAILED DESCRIPTION OF THE INVENTION

Hot, semi-molten-molten steel may be made into very long shapes with uniform thicknesses by use of a rolling mill or rolling process. The rolling process consists of passing a hot steel billet through a "rolling mill", also called a "rolling train". The modern rolling train consists of multiple rolling stands arranged in an in-line configuration.

Figure 1:
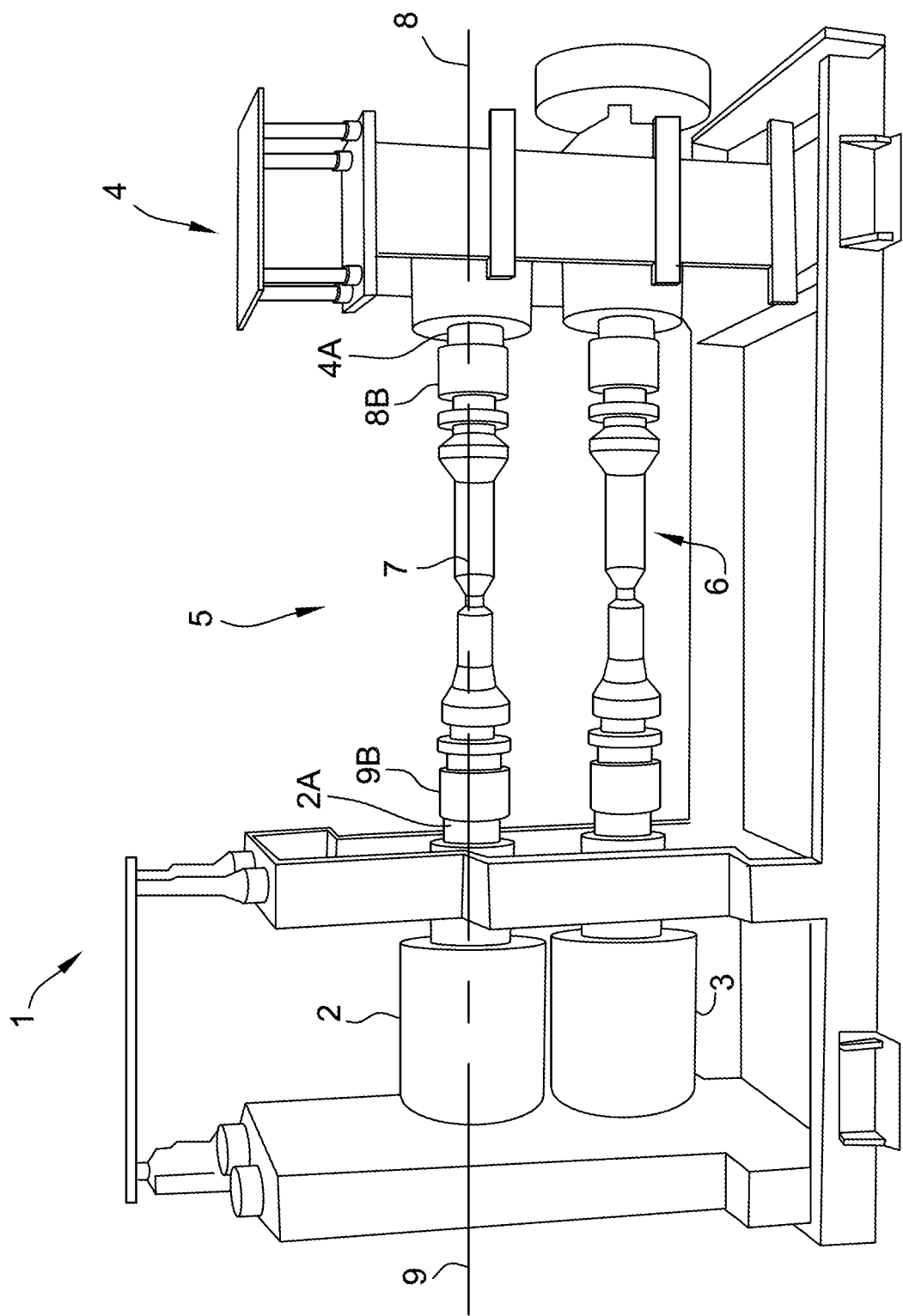
FIG. 1 is a perspective view of rolling stand for use in a metal rolling mill that may incorporate a transmission shaft assembly according to the present invention.

Referring now to FIG. 1, one such rolling stand 1 consists of an upper 2 and a lower roll 3, driven through a gearbox 4 by a power source, for example, an electric motor. The rolls 2 and 3 of the stand 1 may be cylindrical, as shown, or may have contours or "grooves" machined into the rolls. The hot billet passing between the rolls is reduced in size and may be shaped contours or "grooves", changing in shape and or thickness with each subsequent stand. Typical motor sizes for modern mills is 600 kW to 1200 kW for each stand. Typically, 15 to 21 stands are used depending on the size of the feed billet and the finished product. Finishing speeds of 10-15 m/sec. are common today.

The upper roll 2 and the lower roll 3 are positioned at a substantial distance from the gearbox 4 which is used to increase the torque and reduce the speed of the power source. The gearbox 4 is positioned at a substantial distance from the hot billet, so that the gearbox is not harmed by the elevated temperatures of the billet.

Rotating connecting members 5 and 6 connect the gearbox 4 to the upper roll 2 and the lower roll 3, respectively. The rotating connecting members 5 and 6, as shown, are in the form of transmission shaft assemblies or spindles and are supported by bearings and cooled and lubricated by a lubricant. These spindles 5 and 6, be positioned near the hot billet, are exposed to high temperatures and heavy loads.

The spindles 5 and 6 are continuously circulating oil-lubricated spindles. The continuously circulating oil offers users a reliable way to continuously remove damaging heat from spindles while in operation. The continuous oil lubrication and cooling concept significantly extends the life of spindle operations and reduces mill downtime.

According to an exemplary embodiment of the present invention and referring now to FIGS. 1-7D, a spindle or transmission shaft assembly 5 for a rolling stand 1 for use in a metal rolling mill is provided. Note that the upper spindle 5 transmits rotational energy from the gearbox 4 to upper roll 2. It should be appreciated that the rolling stand 1 may include other spindles, for example, lower spindle 6 adapted to transmit rotational energy from the gearbox 4 to lower roll 3. The lower spindle 6 may be similar or identical to the upper spindle 5. It should be appreciated that the rolling mill may include many spindles, each similar or identical to the spindles 5 and 6.

Figure 2:
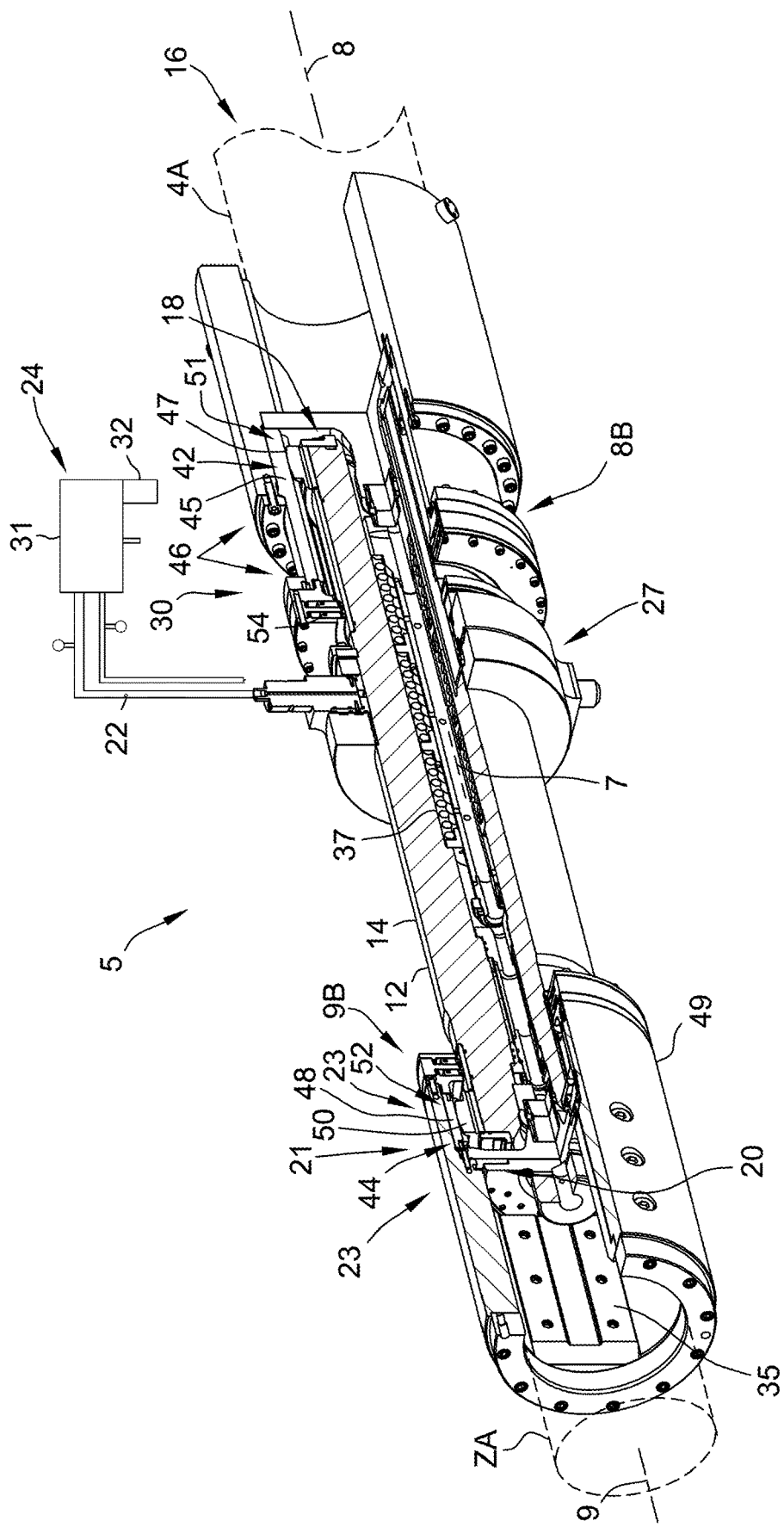
FIG. 2 is a perspective view, partially in cross section, of an embodiment of the present invention showing a transmission shaft assembly according to the present invention.

As shown in FIGS. 1 and 2, the spindle or transmission shaft assembly 5 has a transmission shaft rotational centerline 7. The gearbox 4 has a gearbox output member, for example and as shown, a gearbox output shaft 4A that transmits to torque from the gearbox 4 to the spindle 5. The upper roll 2 has an upper roll input member, for example and as shown, an upper roll input shaft 2A that transmits torque from the spindle 5 to the upper roll 2. The gearbox output shaft 4A rotates about gearbox output shaft centerline 8. Similarly, the upper roll input shaft 4A rotates about upper roll input shaft centerline 9.

To provide smooth transfer of rotational energy from the gearbox 4 to the upper roll 2, the transmission shaft rotational centerline 7, the gearbox output shaft centerline 8, the upper roll input shaft centerline 9 and the transmission shaft rotational centerline 7 are, preferably, coincident. It is extremely difficult to mount the gearbox 4 and the roll 2 in such a position that the gearbox output shaft centerline 8 and the upper roll input shaft centerline 9 are coincident.

To accommodate the lack of coincidence or collinearity of the centerlines 8 and 9, the rolling stand 1 may include a gearbox side head or joint 8B to connect the shaft assembly 5 to the gearbox 4 and a roll side head or joint 9B to connect the shaft assembly 5 to the roll 2.

The gearbox side head 8B and the roll side head 9B may, as shown, be articulating heads so that the gearbox output shaft centerline 8, the upper roll input shaft centerline 9 and the transmission shaft rotational centerline 7 may be at angles to each other and still provide for smooth transfer of rotational energy from the gearbox 4 to the roll 2.

As shown in FIG. 2, the transmission shaft assembly 5 includes a shaft 12. The shaft 12 has an outer periphery 14. The shaft 12, as shown, preferably defines a centrally positioned longitudinal opening 16 extending from a first end 18 to an opposed second end 20 of the shaft 12.

As shown in FIG. 2, the transmission shaft assembly 5, transmits lubricant 22 through the assembly 5. The lubricant 22 serves to cool the shaft assemblies and to provide lubricant 22 to the articulating joints 8B and 9B including gear torque transmitting surfaces 21 and bearing surfaces 23.

The lubricant 22 may be transmitted through the assembly 5 by a lubrication system 24. The lubrication system 24 cycles the lubricant 22 along a lubricant path 25.

Figure 6:
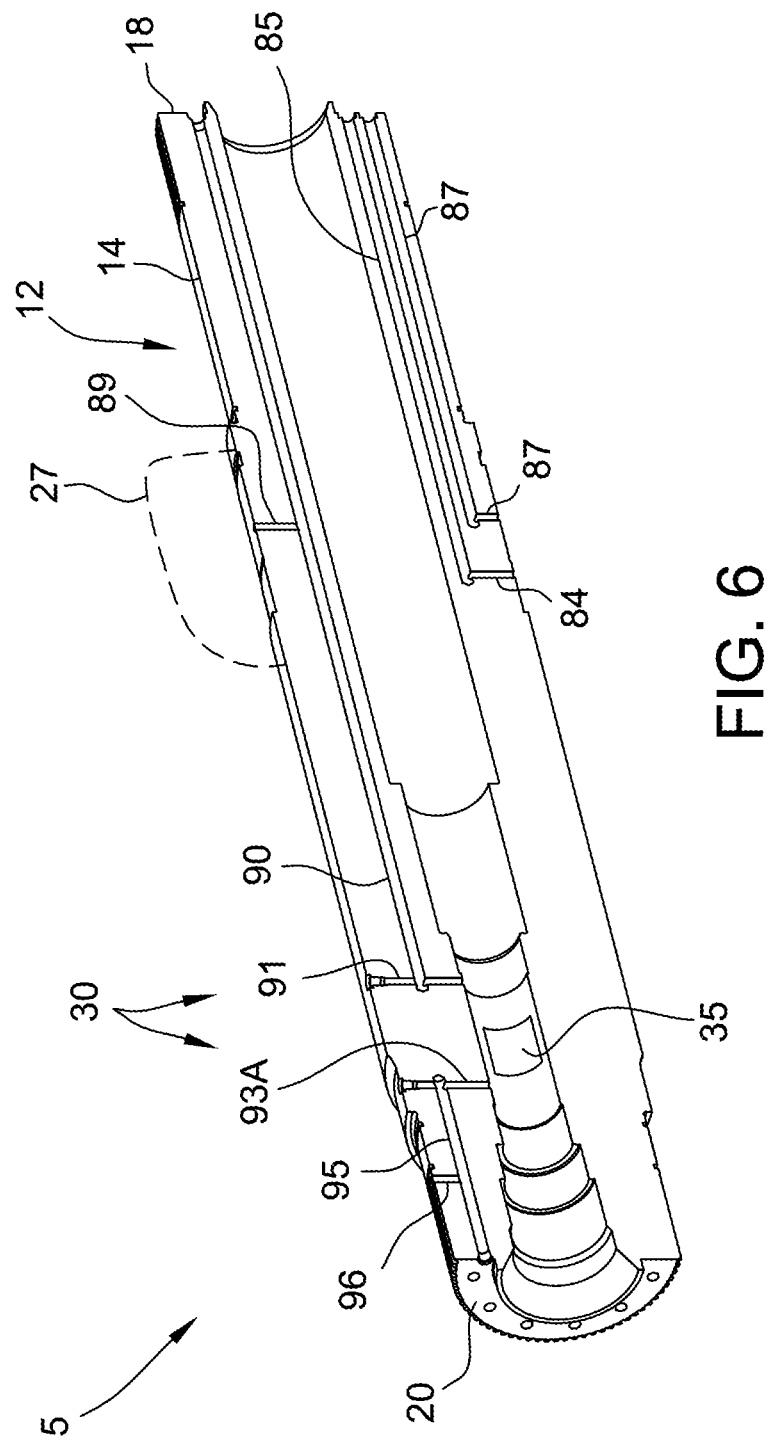
FIG. 6 is a perspective view, partially in cross section, of the transmission shaft of the transmission shaft assembly of FIG. 2, showing axial extending oil passageways.
Figure 7:
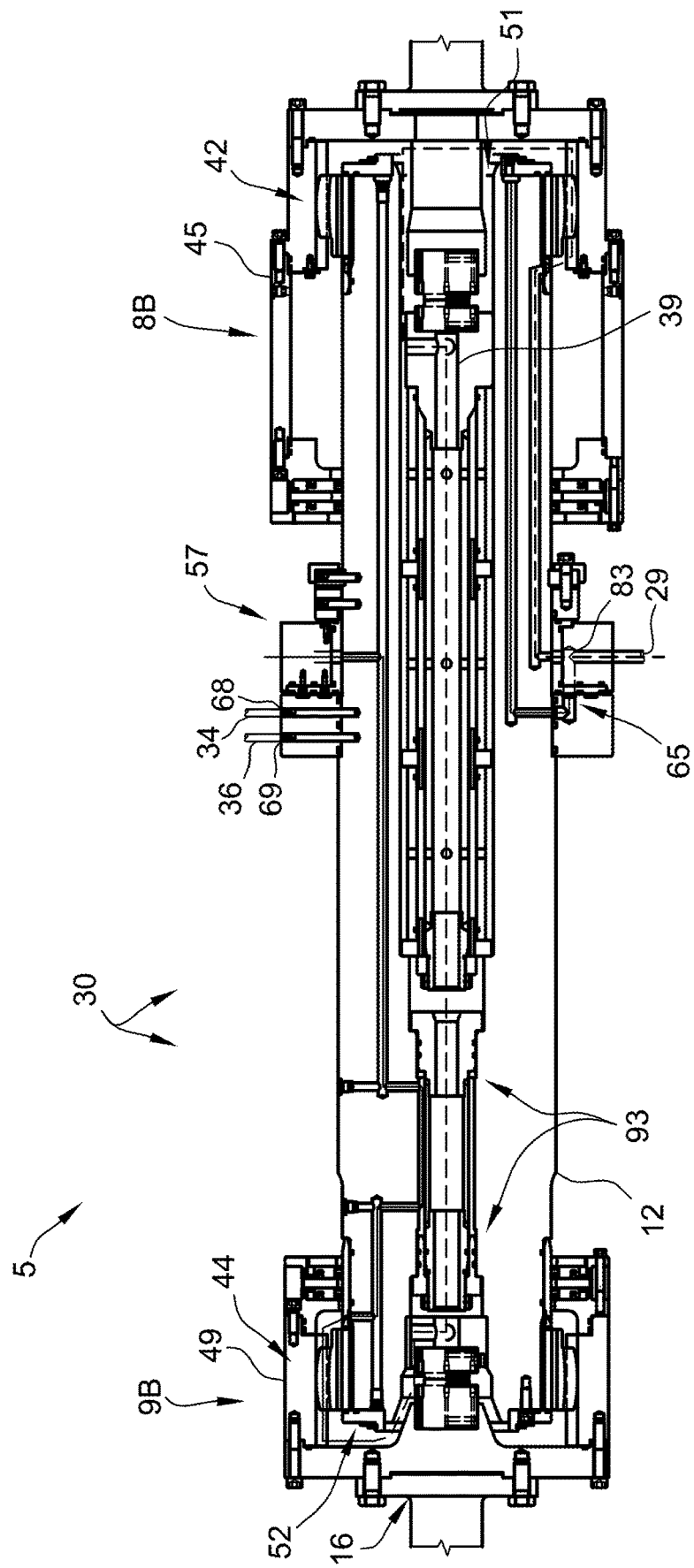
FIG. 7 is a cross sectional view the transmission shaft assembly of FIG. 2, showing the oil paths along the axial extending oil passageways.

Referring to FIGS. 6 and 7, the shaft 12 defines a plurality of internal passageways 26 in the shaft 12. The lubricant 22 flows along the lubricant path 25 in the internal passageways 26 of the shaft.

Referring again to FIGS. 2, 5A and 6, the transmission shaft assembly 5 also includes a rotary distributor 27 mounted on the outer periphery 14 of the shaft 12. As shown in FIG. 2, the rotary distributor 27 receives the lubricant 22 from the input lubricant line 28 and advances it toward the internal passageways 26 and receives the lubricant 22 from the internal passageways 26 and advances it toward the outlet lubricant line 29. The shaft assembly 5 provides a conduit 30 for the lubricant 22 through the plurality of internal passageways 26 in the shaft 12.

The lubrication system 24 may, as shown in FIG. 2, further include a lubricant refreshing device 31 which may clean and cool the lubricant 22 for reuse in the transmission shaft assembly 5. The lubricant refreshing device 31 may be any device that can cool and clean or filter the lubricant 22. Used lubricant 22 from the shaft 12 is transported through the outlet lubricant line 29 to the lubricant refreshing device 31. The lubrication system 24 may further include a pump 32 for urging the lubricant 22 along the lubricant path 25. The pump 32 may be internal or external to the lubricant refreshing device 31.

Figure 5A:
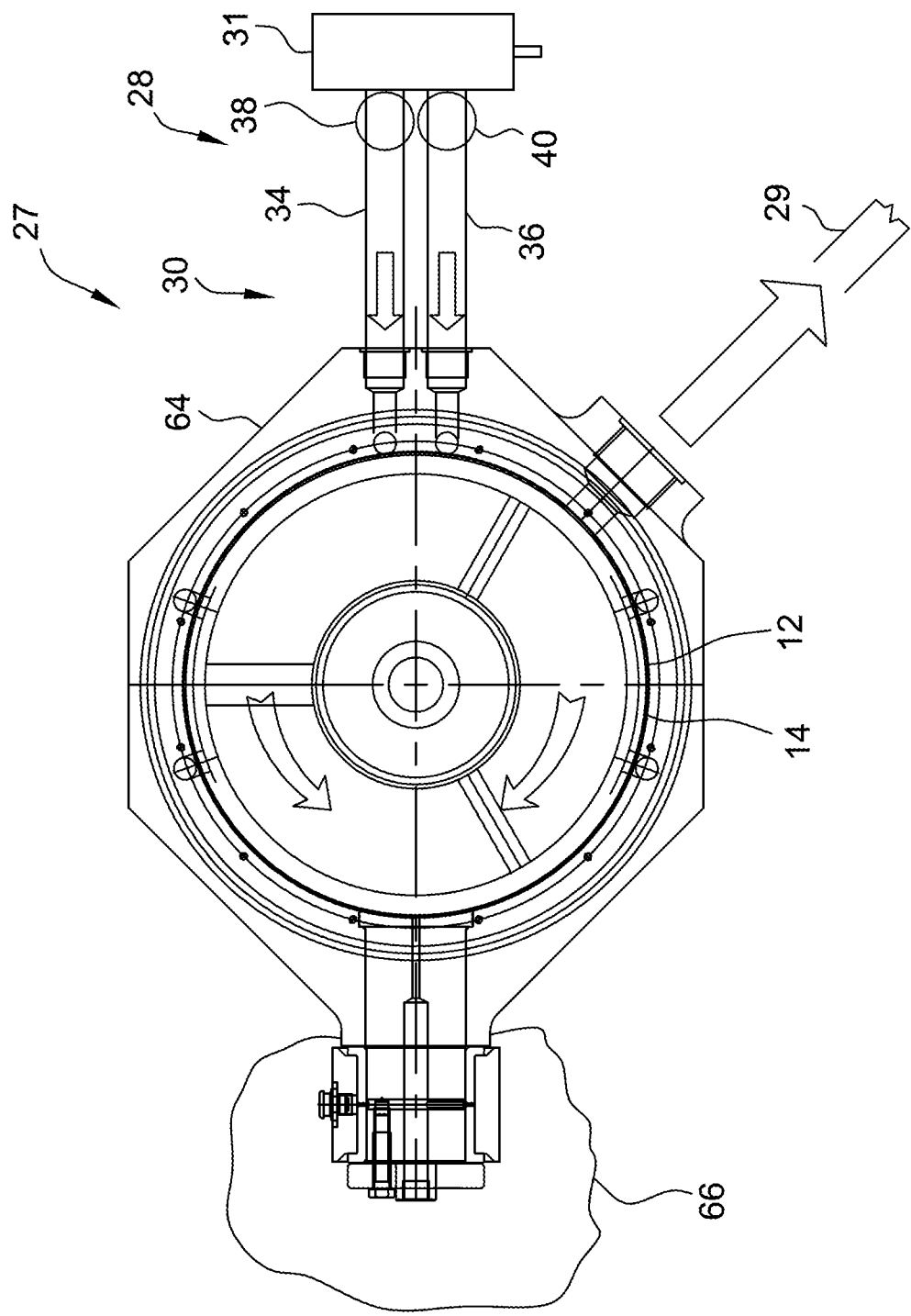
FIG. 5A is a plan view of a hydraulic distributor assembled onto the transmission shaft assembly of FIG. 2.

As shown in FIGS. 2 and 5A, to assure that fresh lubricant flows to both the first end 18 and the second end 20 of the shaft 12, the input lubricant line 27 may be in the form of, or split into, a first input lubricant line 34 for providing lubricant to the first end 18 of the shaft 12 and a second input lubricant line 36 for providing lubricant to the second end 20 of the shaft 12. The first input lubricant line 34 and the second input lubricant line 36 may utilize a common pump or may each have their own pump (not shown). The first input lubricant line 34 may have a gauge 38 in the line 34 to measure flow or pressure in the line 34 to monitor the flow of lubricant 22 going to the first end 18 of the shaft 12.

Similarly, the second input lubricant line 36 may have a gauge 40 in the line to measure flow or pressure in the line 36 to monitor the flow of lubricant 22 going to the second end 20 of the shaft. The gauges 38 and 40 and the lines 34 and 36 assure that a blockage going to either end of the shaft will be detected by at least one of the gauges 38 & 40.

The lubrication system 24 for lubricating the shaft assembly 6 provides lubricant 22 to the support surfaces 23 and torque transmitting surfaces 21 of the shaft assembly 5.

For example and as shown in FIG. 2, since the shaft assembly is in an application where product changes may necessitate production set up and tooling changes and since the shaft assembly is in an environment with elevated temperatures, the shaft assembly S may need to be changed quickly and easily. The heads 8B and 9B may include torque transfer features in the form of for example flats 35 that engage matching features in the shafts 4A and 2A, respectively. The heads 8B and 9B may be configured to move axially toward and away from each other along shaft rotation centerline 7. Springs 37 may be positioned in the longitudinal opening 16 of the shaft 12 to urge the heads 8B and 9B apart. The heads 8B and 9B, as shown, may axially engage the shafts 4A and 2A. The heads 8B and 9B may be urged together, overcoming the force of the springs 37 to permit the heads 8B and 9B to be slid inwardly over the shafts 4A and 2A. The shaft assembly 5 may then be removed radially from the shafts 4A and 2A. A central tube 39 may be positioned inside the springs 37 to accommodate the movement of lubricant 22.

For example and as shown in FIG. 2, torque is transferred from the gearbox side head 8B to the shaft 12 by a first torque transfer arrangement 42, from the shaft 12 to a first torque transfer arrangement 42 and then from the roll side head 9B to the shaft 12 by a second torque transfer arrangement 44. As shown in FIG. 2, the first torque transfer arrangement 42 may be in the form of a couple or coupling set that include an outer coupling member 45 fixed to housing 46 of gearbox side head 8B and an inner coupling member 47 fixed to the outer periphery 14 of shaft 12.

It should be appreciated, that the coupling set 42 may be the form of a gear set, with the outer coupling member 45 in the form of an outer gear fixed to housing or sleeve 46 of gearbox side head 8B and an inner coupling member 47 in the form of an inner gear fixed to the outer periphery 14 of shaft.

Since the gearbox output shaft centerline 8 about which outer gear 45 rotates may be skewed from the transmission shaft rotational centerline 7 about which inner gear 47 rotates, the gears 45 and 47 may have teeth that are curved to accommodate the differences in their respective rotational centerlines. The gears 45 and 47 serve to support first end 18 of the shaft 12.

Similarly, the second torque transfer arrangement 44 may be in the form of a coupling set or gear set that include an outer gear 48 fixed to housing or sleeve 49 of roll side head 9B and an inner gear 50 fixed to the outer periphery 14 of shaft 12. The gears 48 and 50 may have teeth that are curved to accommodate the differences in their respective rotational centerlines. The gears 48 and 50 serve to support second end 18 of the shaft 12.

As stated earlier the lubricant 22 is used to lubricate the matching engaging faces of the teeth of the gear sets 42 and 44. To keep lubricant 22 on the faces of the teeth of the gear sets 42 and 44, the lubricant is contained in a first cavity 51 formed by the first end 18 and periphery 14 of the shaft 12 and the housing 46 of gearbox side head 8B and in a second cavity 52 formed between the second end 20 and periphery 14 of the shaft 12 and housing 53 of roll side head 9B.

Since the gearbox output shaft centerline 8 about which housing 46 of gearbox side head 8B rotates may be skewed from the transmission shaft rotational centerline 7 and from the roll input shaft centerline 9 about which housing 49 of roll side head 9B rotates, the gearbox side head 8B and the roll side head 9B may have a gearbox side head seal 53 and a roll side head seal 54, respectively, to contain the lubricant 22 in the first cavity 51 and in the second cavity 52, respectively.

The gearbox side head seal 53 and the roll side head seal 54 mate with outer periphery 14 of shaft 14 to seal the lubricant 22 within the first cavity 51 and in the second cavity 52, respectively. The seals 53 and 54 may be any seal capable of containing the lubricant 22. For example, the seals may be configured to accommodate a misalignment of the heads 8B and 9B from the shaft 14. The seals 53 and 54 may be permitted to float or move radially as the heads misalign with the shaft so that the seals 53 and 54 remain in uniform contact with the outer periphery 14 of the shaft 14 around the circumference of the shaft 14.

Figure 3:
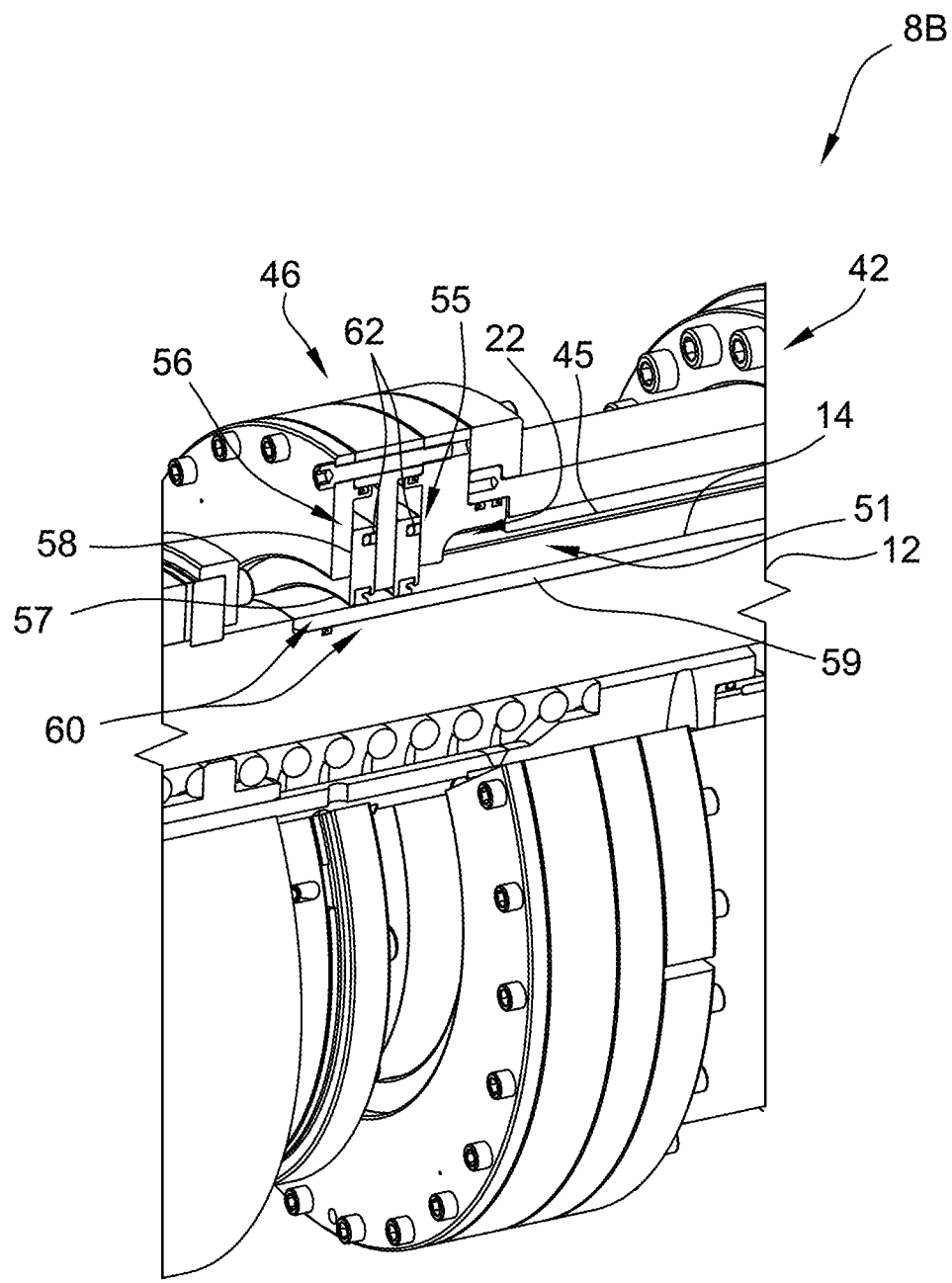
FIG. 3 is a partial perspective view, partially in cross section, of the transmission shaft assembly of FIG. 2, showing lip seals on the shaft in greater detail.

Referring now to FIG. 3, the gearbox side head seal 53 is shown in greater detail within the gearbox side head 8B. The gearbox side head seal 53 may include an inner seal 55 and an outer seal 56. The seals 55 and 56 may each include a lip seal portion 57 and a seal body 58. The lip seal portion 57 engages the periphery 14 of the shaft 12. As shown, the shaft 12 may include an outer cylindrical sleeve 59. The outer cylindrical sleeve 59 may be made of a material more suitable for engagement with the seal 53 and may be replaced when wear necessitates its replacement.

The seal body 58 of the seals 55 and 56 may be slidingly fitted to pockets 60 formed in the housing 46 of the gearbox side head 8B to permit the seals to axially float in the housing, permitting the lip seal portion 56 to better conform to periphery 14 of shaft 12 if the housing 46 and the shaft 12 are not perfectly concentric. O-rings 62 may be positioned in the pockets 60 to prevent lubricant leakage as the seals 55 and 56 axially float in the pockets 60 of the housing 46.

Referring now to FIGS. 4, 5A, 5C and 5D, the rotary distributor 27 is shown in greater detail. The rotary distributor 27 serves to permit lubricant 22 to enter and exit the shaft 12 while the shaft 12 is rotation. The rotary distributor may have any configuration that accomplishes the entering and exiting of lubricant through the rotating shaft 12. For example and as shown in FIGS. 4 and 5A-D, the rotary distributor 27 may include a body 64 which is stationary, as the shaft 12 rotates. The body 64 may be rotationally fixed to an anchor 66 by, for example a protrusion in the form of a pin 67 extending radially outwardly from the body 64. The pin 67 may be cylindrical and permit radial motion of the pin to the anchor 66 to accommodate any runout that may occur in the shaft 12 as it rotates Referring now to FIGS. 4 and 5A, to permit separate lubricant flow to the gearbox side head 8B and the roll side head 9B, the body 64 of the rotary distributor 27 may include a gearbox side lubricant inlet port 68 and a roll side lubricant inlet port 69. The gearbox side lubricant inlet port 68 is connected to the first input lubricant line 34 and the roll side lubricant inlet port 69 is connected to the second input lubricant line 36.

To receive the used lubricant flow, the body 64 of the rotary distributor 27 may include an outlet port 70. The outlet inlet port 70 is connected to the outlet lubricant line 29.

Figure 4:
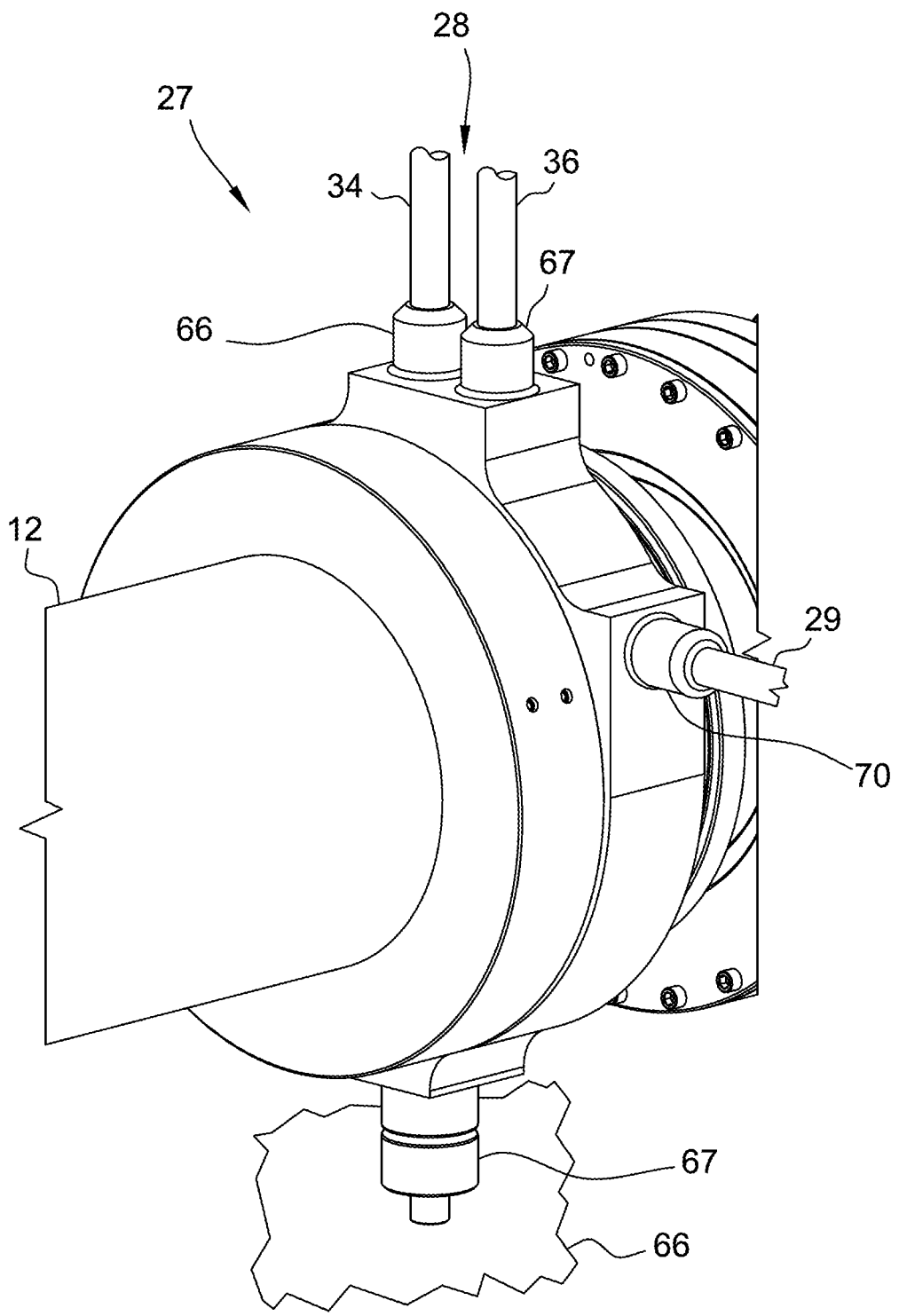
FIG. 4 is a partial perspective view of the transmission shaft assembly of FIG. 2, showing a collar used to inject and withdraw oil into the shaft assembly.
Figure 5B:
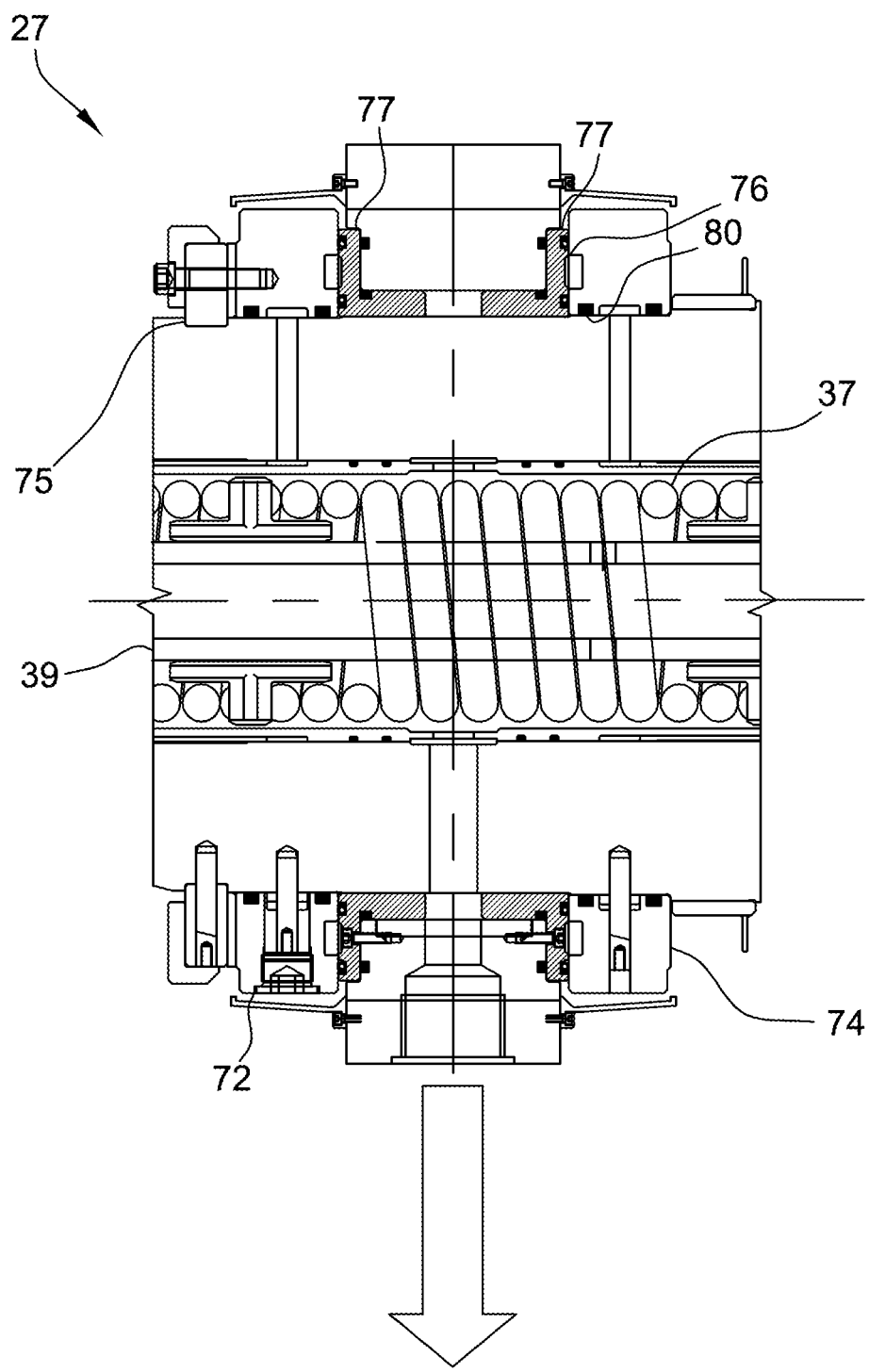
FIG. 5B is a partial plan view, partially in cross section, of the distributor of FIG. 5A.

While the anchor 66 and pin 67 prevents rotation of the body 64 of the rotary distributor 27, preventing axial movement of the body 64 along shaft 12 is also desired. As shown in FIGS. 4, 5B and 5D, the rotary distributor 27 may further include an axial movement limiting device in the form of a gearbox side shoulder ring 72 and a roll side shoulder ring 74. The rings 72 and 74 rotate with the shaft 12 and limit axial motion of the body 64 of the rotary distributor 27.

As shown in FIGS. 5B and 5D, to prevent excessive axial load on the rotary distributor 27, one of the gearbox side shoulder ring 72 and the roll side shoulder ring 74 is axial fixed and the other axially floats. As shown in 5B and 5D, the gearbox side shoulder ring 72 floats and the roll side shoulder ring 74 is fixed. The floating of the gearbox side shoulder ring 72 is permitted using a locking ring 75 which is fixedly secured to the shaft 12. The locking ring 75 permits a limited amount of axial float to the gearbox side shoulder ring 72. A shim 75A may be positioned between the locking ring 75 and the gearbox side shoulder ring 72 to accurately set and or adjust the axial float.

To control the rotation of the shaft within the rotary distributor 27, a bearing support is desired to support the rotary distributor 27 on the shaft. The bearing support, as shown in FIGS. 5B and 5D, may be provided by a sleeve bearing in the form of bronze bushing 76. Note that other materials, including other metals, polymers and composites or any others used for sleeve bearing may likewise be used.

The bushing 76 may as shown be fixedly secured to the body 64 of the rotary distributor 27. The bushing 76 may include radially extending side walls 77 which may provide bearing surfaces for the shoulder rings 72 and 74. The bushing 76 may include grooves 78 for receiving seals in the form of, for example, O-rings 80 to contain the lubricant 22.

The bushing 76 may be lubricated with lubricant 22 coming from the first input lubricant line 34 or from the second input lubricant line 36. Alternatively, the bushing 76 may be lubricated with lubricant 22 coming from a third input lubricant line (not shown). The body 64 of the rotary distributor 27 may define a body cavity 65 that contains lubricant 22 for use to lubricate bushing 76. The body cavity 65 is in fluid communication with either the first input lubricant line 34 or the second input lubricant line 36 through the respective one of the gearbox side lubricant inlet port 68 or the roll side lubricant inlet port 69.

Figure 5C:
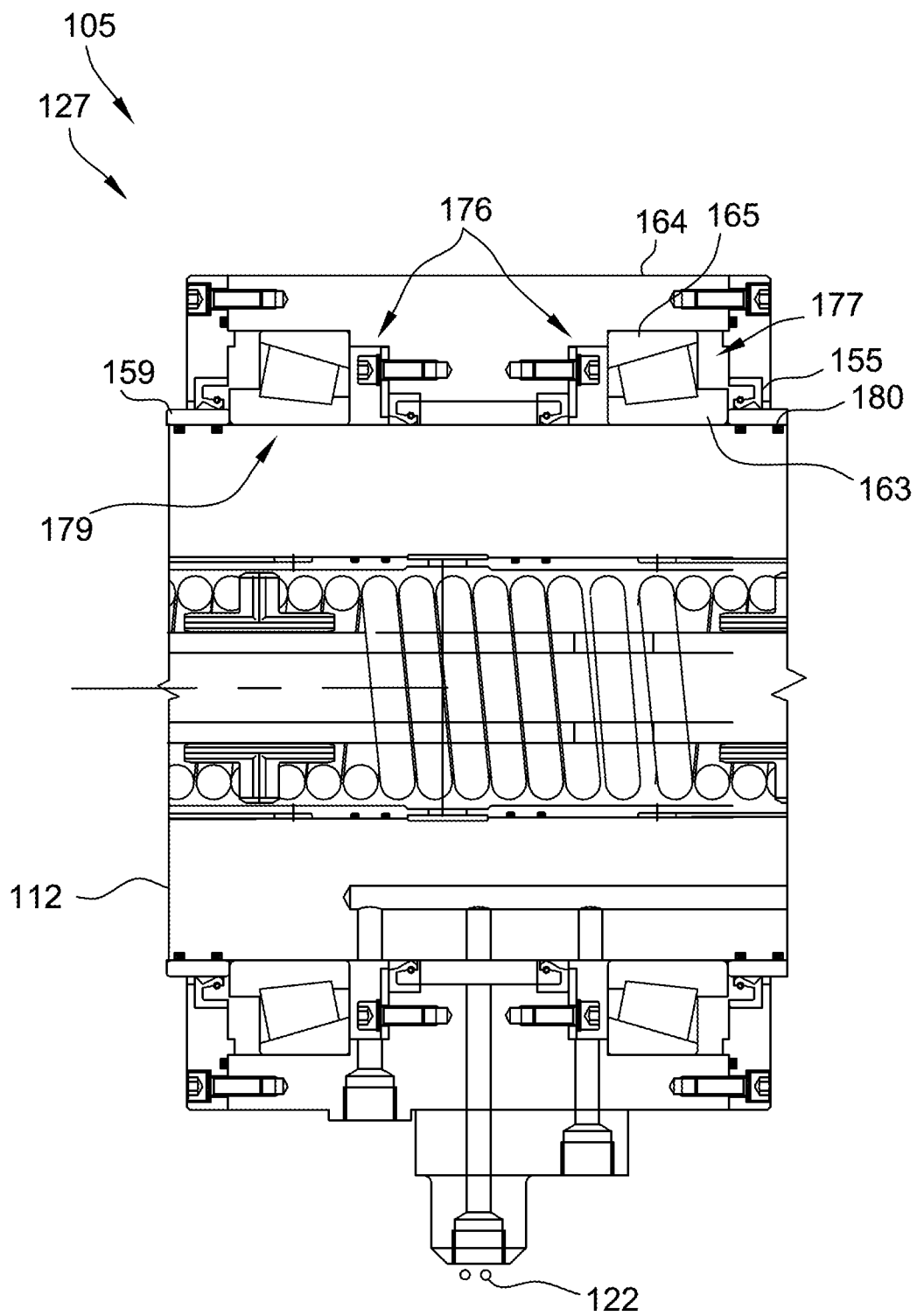
FIG. 5C is a partial plan view, partially in cross section, of an alternate distributor utilizing roller bearings.
Figure 5D:
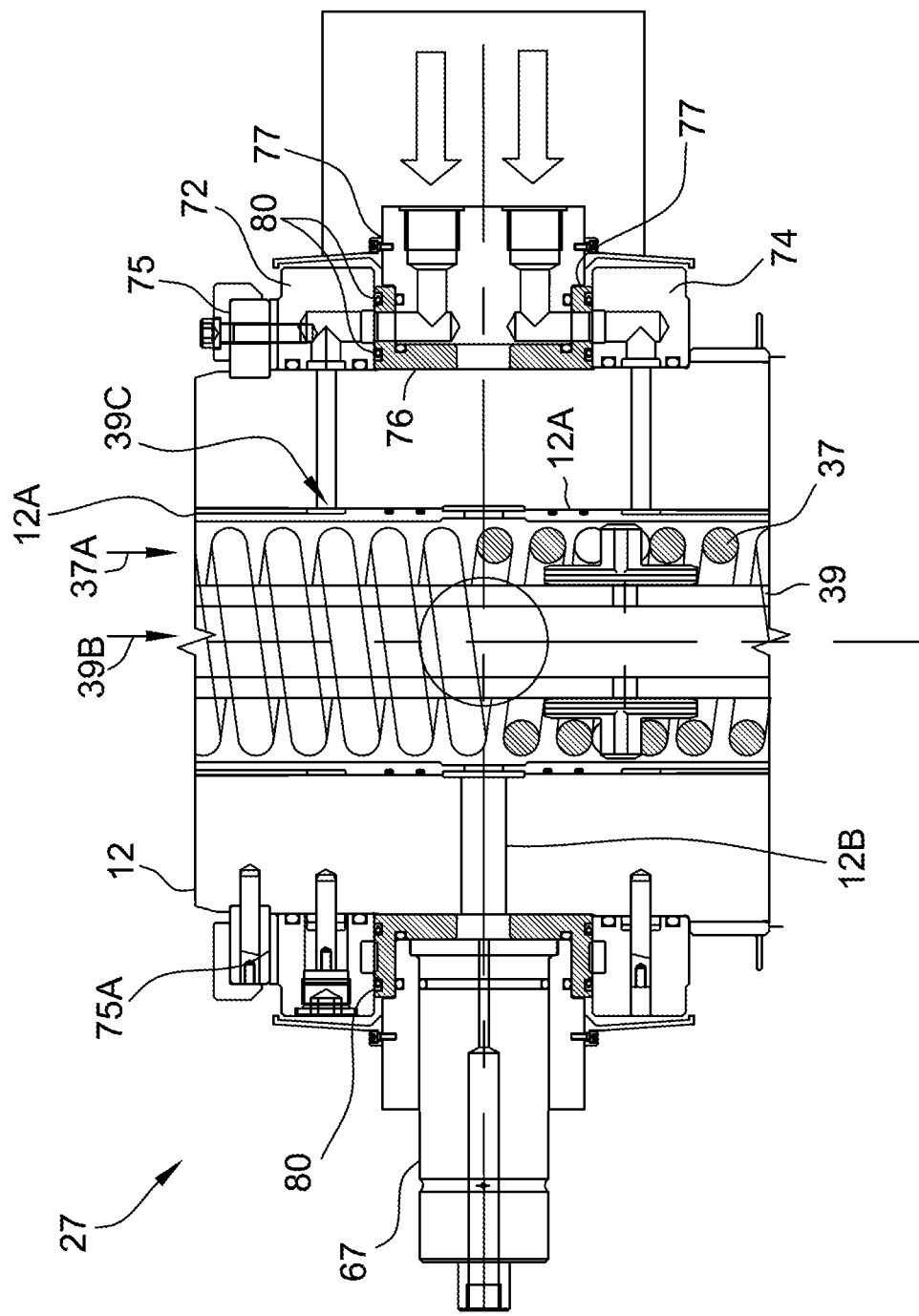
FIG. 5D is a partial plan view, partially in cross section, of the distributor of FIG. 5A.

Referring now to FIG. 5C, another embodiment of the present invention is shown as shaft assembly 105. Shaft assembly 105 is similar to shaft assembly 5 of FIGS. 1-4, 5A, 5B and 5D, except shaft assembly 105 includes bearing support for rotary distributor 127 in the form of a rolling element bearing 176. As shown the rolling element bearing 176 is in the form of a tapered bearing set including a gear side bearing 177 and a roll side bearing 179. The bearings 177 and 179 include inner races 163 which are fixedly secured to the shaft 112 and outer races 165 that are fixedly secured to body 164 of the rotary distributor 127. The shaft 112 may include sleeves 159 for reduced wear and improved sealing to lip seals 155. O-rings 180 may be used to limit the leakage of lubricant 122.

Referring now to FIGS. 6 and 7, the lubricant paths including the portion along their internal passageway formed in the shaft 12 are shown in greater detail.

As shown in FIGS. 6 and 7, a gearbox side head lubricant path, shown as arrows 82, is used to send fresh lubricant 22A from the first input lubricant line 34 to the gearbox side head 88 to cool and lubricate gearbox side gear set 42 and to return used lubricant 22B to the outlet lubricant line 29. The path 82 starts at first input lubricant line 34 and progresses through gearbox side lubricant inlet port 68 on the rotary distributor 27.

From the port 68 the path 82 continues through rotary distributor lubricant channels 83 to first radially extending hole 84 formed in shaft 12. From the first radially extending hole 84, the path 82 extends axially through first axially extending hole 85 formed in shaft 12 which is parallel and spaced from the longitudinal opening in the shaft 12. From the first axially extending hole 85 the path extends into cavity 51 formed in housing 46 of head 8B. When in the cavity 51, the path 82 extends to the gearbox side gear set 42 where the fresh lubricant 22A cools and lubricates the gear set 42.

From the cavity 51, used lubricant 22B leaves the cavity along path 82 through second axially extending hole 86 formed in shaft 12 which is parallel and spaced from the longitudinal opening in the shaft 12. From the second axially extending hole 86, the path 82 extends radially through second radially extending hole 87 formed in shaft 12. From the second radially extending hole 87, the used lubricant 22B enters the rotary distributor 27 through rotary distributor lubricant channels 83. The used lubricant 22B then leaves along path 82 through the outlet port 70 to the outlet lubricant line 29.

As shown in FIGS. 6 and 7, a roll side head lubricant path, shown as arrows 88, is used to send fresh lubricant 22A from the second input lubricant line 36 to the roll side head 9B to cool and lubricate roll side gear set 44 and to return used lubricant 22B to the outlet lubricant line 29. The path 88 starts at second input lubricant line 36 and progresses through roll side lubricant inlet port 69 on the rotary distributor 27. From the port 69 the path 88 continues through rotary distributor lubricant channels 83 to third radially extending hole 89 formed in shaft 12. From the third radially extending hole 89, the path 88 extends axially through third axially extending hole 90 formed in shaft 12 which is parallel and spaced from the longitudinal opening in the shaft 12.

From the third axially extending hole 90, the path 88 extends radially inwardly through fourth radially extending hole 91 formed in shaft 12 to a cavity 92 formed by tube 35, plugs 93 and longitudinal opening 16 in shaft 12. From the cavity 92 the path 88 extends radially outwardly through fifth radially extending hole 94 formed in shaft 12. From the fifth radially extending hole 93A, the path 88 extends axially through fourth axially extending hole 94 formed in shaft 12 which is parallel and spaced from the longitudinal opening in the shaft 12 and then radially outwardly to sixth radially extending hole 96 formed in shaft 12. From the sixth radially extending hole 96 the path 88 extents into cavity 52 formed in housing 49 of head 9B. When in the cavity 52, the path 88 extends to the roll side gear set 44 where the fresh lubricant 22A cools and lubricates the gear set 44.

From the cavity 52, used lubricant 22B leaves the cavity 51 along path 88 through the longitudinal opening in the shaft 12 to the cavity 51 formed in housing 46 of head 8B. From the cavity 51 the path 88 extends into second axially extending hole 86. From second axially extending hole 86, the path 88 extends radially through second radially extending hole 87 formed in shaft 12. From the second radially extending hole 87, the used lubricant 22B enters the rotary distributor 27 through rotary distributor lubricant channels 83.

Alternatively and referring to FIG. 5D, 6 and 7, the used lubricant 22B may exit the cavity 51 along the longitudinal passageway 39A formed in tube 39 and through axial opening 39B in tube 39 and/or through passageway 37A between the tube 39 and the shaft 12. From the passageway 37A, the used lubricant 22B may pass through axial opening 39C in inner shaft liner 12A and through axial opening 12B in shaft, entering the rotary distributor 27 through rotary distributor lubricant channels 83.

The used lubricant 22B then leaves along path 88 through the outlet port 70 to the outlet lubricant line 29.

Referring to FIGS. 8A-D, 9 and 10, another embodiment of the present invention is shown as shaft assembly 205. The shaft assembly 205 is similar to shaft assembly 5 of FIGS. 1-7, except shaft assembly 205 utilizes a first sleeve or hollow inner shirt 210 within longitudinal opening 216 of shaft 212 to serve as portions of the lubricant path 225. Shaft assembly 205 reduces the number of long internal passageways needed for the shaft assembly, compared to shaft assembly 5. Also, if the portions of the lubricant path 225 formed by the first sleeve is placed in a helical manner, the helical positioning may serve as a pump to assist the flow of lubricant in the path as the shaft rotates.

Figure 9:
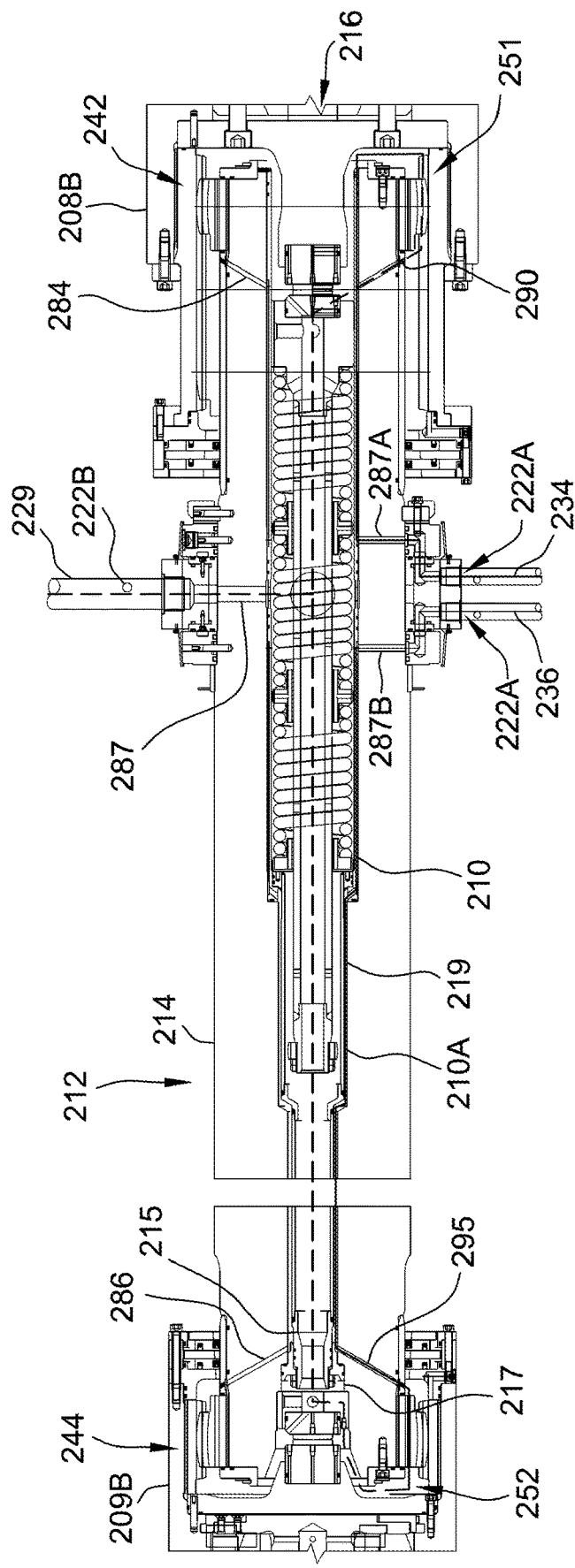
FIG. 9 is a cross section view of the transmission shaft assembly of FIG. 8A.

Referring to FIG. 9, the shaft assembly 205 is similar to shaft assembly 5 of FIGS. 1-7. Shaft assembly 205 includes a shaft 212 similar to shaft 12 of FIGS. 1-7, except shaft 212 does not have some of the axially extending internal passageways for shaft 12. The shaft 212 is supported on its first end 218 by gearbox side head 208B and on its second end 220 by roll side head 209B. The heads 208B and 209B are similar to heads 8B and 9B of the shaft assembly 5 of FIGS. 1-7. The hollow inner shirt or sleeve 210 is fitted to longitudinal opening 216 in shaft 212. A second hollow inner shirt or second sleeve 210A may also be fitted to the internal longitudinal opening 216 in shaft 212.

The shaft assembly 205 includes a rotary distributor 227 connected to the shaft 212 on its periphery 214. The rotary distributor 227 is similar to distributor 27 of FIGS. 1-7. The rotary distributor 227 advances lubricant 222 to gearbox side gear set 242 and roll side gear set 244 along lubricant path 225. The gearbox side gear set 242 and roll side gear set 244 are similar to gearbox side gear set 42 and roll side gear set 44 of FIGS. 1-7.

Referring now to FIG. 8A, the first sleeve 210 includes external grooves 211 extending both radially and axially. It should be appreciated that the grooves 211 may merely extend axially. By extending both radially and axially, the first sleeve 210 may be stronger and the combined radially and axial extending grooves 211 may serve as a pump to assist the flow of lubricant in the path as the shaft 212 rotates. The grooves 211, as shown, may be helically shaped or spirally shaped. As shown the grooves may include a helically shaped gearbox side groove 211A and a helically shaped roll side groove 211B. As shown the grooves 211A and 211B have the same orientation. It should be appreciated that the grooves may have opposed orientation to assist movement of the lubricant 222 in the grooves 211A and 211B.

As shown in FIGS. 8D and 9, the first sleeve 210 may include a gearbox side inlet cylindrical circumferential groove 241 and a roll side inlet cylindrical circumferential groove 243 formed in the outer periphery of the first sleeve 210. The gearbox side inlet cylindrical circumferential groove 241 provides a lubricant passage between the gearbox side helically shaped groove 211A and gearbox side head lubricant line 234. Similarly, the roll side inlet cylindrical circumferential groove 243 provides a lubricant passage between the roll side helically shaped groove 211B and roll side head lubricant line 236. The first sleeve 210 may further include a sleeve radial cross hole 213 through the first sleeve 210. The sleeve radial cross hole 213 provides a lubricant passage from the between the longitudinal opening 216 of the shaft 212 and outlet lubricant line 229.

Referring to FIG. 8B, the shaft 205 may include a first radially extending hole 284 for passage of fresh lubricant 222A to the gearbox side head 2088. The shaft 205 may also include a second radially extending hole 286 for passage of fresh lubricant 222A to the roll side head 209B. The shaft 205 may also include a third radially extending hole 287 for passage of used lubricant 222B from the longitudinal opening 216 of the shaft 212. The first radially extending hole 284 may be in the form of first gearbox side passageway 284 for passage of fresh lubricant 222A from longitudinal opening 216 of shaft 212 to gearbox side heard cavity 251 in gearbox side head 208B. While a solitary gearbox side passageway may be sufficient, as shown in FIG. 8B the shaft 205 includes a second gearbox side passageway 290 positioned opposed to the first gearbox side passageway 284.

The second radially extending hole 286 may be in the form of a first roll side passageway 286 for passage of fresh lubricant 222A from longitudinal opening 216 of shaft 212 to roll side head cavity 252 in roll side head 209B. While a solitary roll side passageway may be sufficient, as shown in FIG. 8B the shaft 205 includes a second roll side passageway 295 positioned opposed to the first roll side passageway 286. The passageway 284, 286, 290 and 295 may be radial or normal to the shaft centerline 7, or as shown be skewed axially outwardly to reduce the length of second sleeve 210A.

The shaft 212 may further include a distribution gearbox side radial through hole 287A for passage of fresh lubricant 222A from the rotary distributor 227 to the first sleeve 210 and a distribution roll side radial through hole 287B for passage of fresh lubricant 222A from the rotary distributor 227 to the first sleeve 210.

Referring to FIG. 8C, the second sleeve 210A is shown in greater detail. The second sleeve 210A includes a main body 215 and adapters 217. It should be appreciated that the invention may be practiced with the first sleeve 210 and the second sleeve 210A being integral with each other. The use of the separate first sleeve 210 and second sleeve 210A may provide for ease of manufacture and assembly. While the second sleeve 210A may have helical groove(s) like the first sleeve 210, the second sleeve 210A may (as shown in FIG. 9) have an outer periphery 219 at least partially spaced from the shaft 212 to provide a lubricant passageway between the shaft and the outer periphery 219 of the second sleeve 210A. It should be appreciated that the first sleeve 210 may similarly use space between its outer periphery 210A and the shaft 210 as the lubricant passageway.

Figure 10:
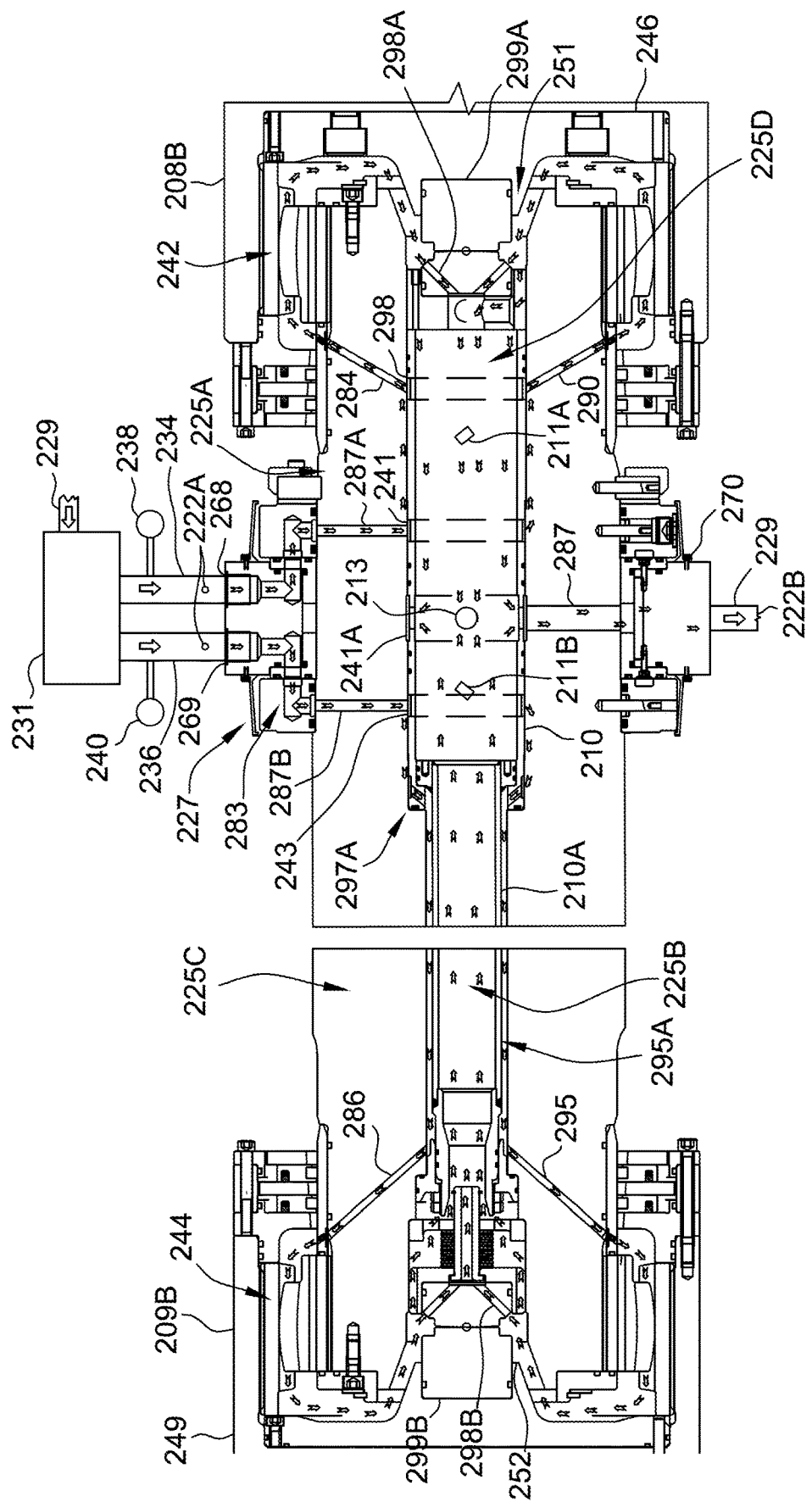
FIG. 10 is a cross section view of the transmission shaft assembly of FIG. 8A showing the oil paths along the spirally extending oil passageways.

Referring now to FIGS. 9 and 10, the lubricant paths 225 are shown as arrows 225A, 225B, 225C and 225D, respective, for the gearbox side fresh lubricant path 225A, the gearbox side used lubricant path 225B, the roll side fresh lubricant path 225C, and the roll side used lubricant path 225D. As shown in FIG. 9 and FIG. 10, fresh lubricant 222A flows from lubricant refreshing device 231 similar to device 31 of FIGS. 1-7. The fresh lubricant 222A from the device 231 is preferably separated so that flow can be assured to both the gearbox side head 208B and the roll side head 209B. The fresh lubricant 222A exiting the device 231 enters gearbox side head lubricant line 234 and enters roll side head lubricant line 236. The gearbox side head lubricant line 234 may include gearbox side head line lubricant gauge or measuring device 238 and the roll side head lubricant line 236 may include roll side head line lubricant gauge or measuring device 240. The gauges 238 and 240 may be connected to monitoring systems (not shown) to monitor whether lubricant is flowing (using a flow measuring device) or has proper pressure (using a pressure gage).

Referring again to FIG. 10, the flow of fresh lubricant 222A along gearbox side fresh lubricant path is shown by arrows 225A. The fresh lubricant 222A moves from the lubricant refreshing device 231 to gearbox side head lubricant line 234. From the gearbox side head lubricant line 234, the fresh lubricant 222A moves through gearbox side inlet port 268 on the rotary distributor 227 to internal channels 283 formed in the rotary distributor 227. From the internal channels 283 in the rotary distributor 227, fresh lubricant 222A moves through distribution gearbox side radial through hole in shaft 212 to gearbox side inlet cylindrical circumferential groove 241.

From gearbox side inlet cylindrical circumferential groove 241, fresh lubricant 222A moves through gearbox side helically shaped groove 211A to gearbox side outlet cylindrical circumferential groove 298 formed in the first sleeve 210. From the gearbox side outlet cylindrical circumferential groove 298, fresh lubricant 222A moves through the gearbox side passageways 284 and 290 to the gearbox side head cavity 251. Fresh lubricant in the cavity 251 cools, cleans and lubricates the gearbox side gear set 242.

Referring again to FIG. 10, the flow of used lubricant 222B along gearbox side used lubricant path is shown by arrows 225B. Used lubricant 222B moves through plug passageways 298A formed in gearbox side plug 299A to the longitudinal opening 216 internal to first sleeve 210. It should be appreciated that the plug 299A may be integral with the gear side head housing 246.

From the longitudinal opening 216, used lubricant 222B passes through sleeve radial cross hole 213 to outlet cylindrical circumferential groove 241A formed in the first sleeve 210. From the outlet cylindrical circumferential groove 241A, the used lubricant 222B moves through third radially extending hole 287 in shaft 212 to internal channels 283 formed in the rotary distributor 227. It should be appreciated that if the sleeve radial cross hole 213 and the third radially extending hole 287 in shaft 212 are aligned, the outlet cylindrical circumferential groove 241A could be eliminated. From the internal channels 283, the used lubricant 222B moves through outlet port 270 to outlet lubricant line 229. From the outlet lubricant line 229, the used lubricant 222B returns to the lubricant refreshing device to complete its journey.

Referring again to FIG. 10, the flow of fresh lubricant 222A along roll side fresh lubricant path is shown by arrows 225C. The fresh lubricant 222A moves from the lubricant refreshing device 231 to roll side head lubricant line 236. From the gearbox side head lubricant line 236, the fresh lubricant 222A moves through roll side inlet port 269 on the rotary distributor 227 to internal channels 283 formed in the rotary distributor 227. From the internal channels 283 in the rotary distributor 227, fresh lubricant 222A moves through distribution roll side radial through hole 287B in shaft 212 to roll side inlet cylindrical circumferential groove 243.

From roll side inlet cylindrical circumferential groove 243, fresh lubricant 222A moves through roll side helically shaped groove 211B to roll side outlet cylindrical circumferential groove 243 formed in the first sleeve 210. From the roll side outlet cylindrical circumferential groove 299, fresh lubricant 222A moves through second sleeve passageways 297A formed in second sleeve 210A.

From the second sleeve passageways 297A, fresh lubricant 222A moves through cylindrical passageway 295A formed between the second sleeve 210A and shaft 212 to roll side passageways 286 and 295. It should be appreciated that a helical groove could be used instead of the cylindrical passageway 295A. passageways 297A formed in second sleeve 210A.

From the roll side passageways 286 and 295, fresh lubricant 222A moves through to the roll side head cavity 252. Fresh lubricant in the cavity 252 cools, cleans and lubricates the roll side gear set 244.

Referring again to FIG. 10, the flow of used lubricant 222B along roll side used lubricant path is shown by arrows 225D. Used lubricant 222B moves through plug passageways 299B formed in roll side plug 299B to the longitudinal opening 216 internal to first sleeve 210. It should be appreciated that the plug 299B may be integral with the roll side head housing 249.

From the longitudinal opening 216, used lubricant 222B passes through sleeve radial cross hole 213 to outlet cylindrical circumferential groove 241A formed in the first sleeve 210. From the outlet cylindrical circumferential groove 241A, the used lubricant 222B moves through third radially extending hole 287 in shaft 212 to internal channels 283 formed in the rotary distributor 227. From the internal channels 283, the used lubricant 222B moves through outlet port 270 to outlet lubricant line 229. From the outlet lubricant line 229, the used lubricant 222B returns to the lubricant refreshing device to complete its journey.

Figure 11:
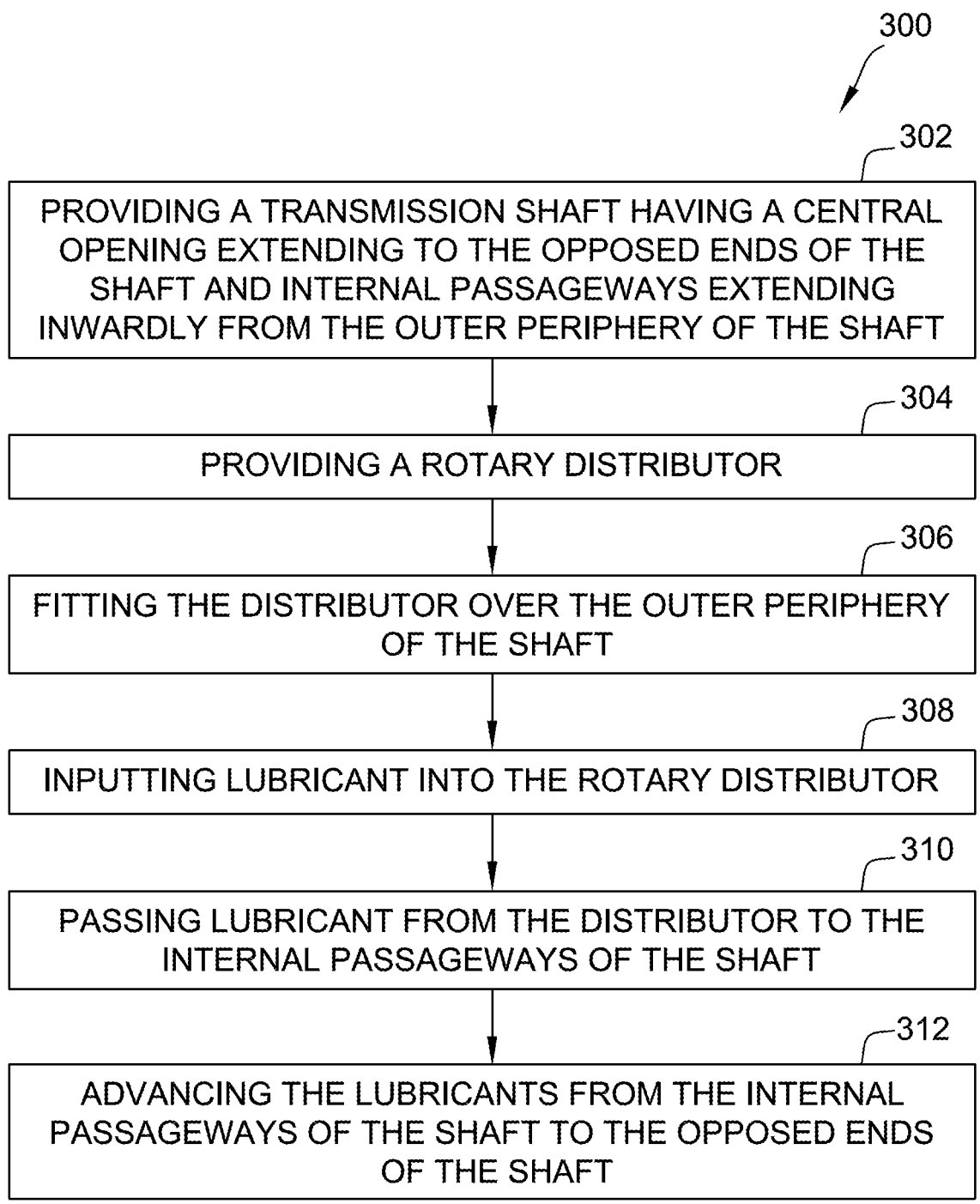
FIG. 11 is a flow chart of a method of using a transmission shaft assembly according to another embodiment of the present invention.

Referring now to FIG. 11, according to yet another embodiment of the present invention, method 300 for method for providing lubrication to a transmission shaft in a rolling mill machine is provided. The method 300 includes step 302 of providing a transmission shaft having a central opening extending to the opposed ends of the shaft and internal passageways extending inwardly from the outer periphery of the shaft and step 304 of providing a rotary distributor. The method 300 further includes step 306 of fitting the distributor over the outer periphery of the shaft and step 308 of inputting lubricant into the rotary distributor. The method 300 also includes the step 310 of passing lubricant from the distributor to the internal passageways of the shaft and step 312 of advancing the lubricant from the internal passageways of the shaft to the opposed ends of the shaft.

According to yet another embodiment of the present invention, the method 300 may be provided such that the method further includes the step of inserting a sleeve into the central opening of the shaft.

According to yet another embodiment of the present invention, the method 300 may be provided such that the method further includes the step of providing a passageway between the sleeve and the body and wherein the step of advancing the lubricant from the internal passageways of the shaft to the opposed ends of the shaft includes advancing the lubricant along the passageway between the sleeve and the body.

According to yet another embodiment of the present invention, the method 300 may be provided such that the step of providing a passageway between the sleeve and the body includes providing a helical passageway between the sleeve and the body.

The methods, systems, and apparatus described herein facilitate efficient and economical cooling and lubrication of a spindle. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing different coolant flow into and out of a spindle that reduces or eliminates the excessive maintenance costs and down time caused by the ineffective and expensive spindle lubrication methods. Furthermore, the exemplary methods system and apparatus achieve increased reliability while lowering investment and maintenance costs. The methods, system and apparatus described herein may be used in any suitable application. However, they are particularly suited for high temperature spindle application, such as rolling mills.

Exemplary embodiments of the spindle device and system are described above in detail. The spindle and the associated systems and methods are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transmission shaft assembly for a rolling stand for use in a metal rolling mill, the shaft assembly transmitting lubricant through the assembly, the transmission shaft assembly comprising:
    a shaft including an outer periphery and an inner periphery defining a centrally positioned longitudinal opening extending from a first end to an opposed second end of the shaft, the centrally positioned longitudinal opening facilitating conveying of fluid between the first end and the opposed second end;
    a sleeve including an outer periphery thereof fitted to the inner periphery the shaft, wherein the sleeve is hollow, wherein a space between the inner periphery of the shaft and the outer periphery of the sleeve define a plurality of internal passageways; and
    a rotary distributor mounted on the outer periphery of said shaft and adapted to provide a conduit for the lubricant through the plurality of internal passageways.

2. The transmission shaft assembly as in claim 1, wherein said rotary distributor includes first and second inputs for inputting lubricant into the distributor and an output for outputting lubricant from the distributor.

3. The transmission shaft assembly as in claim 1, wherein said rotary distributor includes first and second seals, the seals axially spaced apart from each other and adapted to seal said rotary distributor to the outer periphery of said shaft.

4. The transmission shaft assembly as in claim 3, wherein the seals are lip seals.

5. The transmission shaft assembly as in claim 1, wherein said plurality of internal passageways includes a plurality of radially extending passageways and a plurality of axially extending passageways.

6. The transmission shaft assembly as in claim 1, wherein said plurality of internal passageways includes at least one passageway that extends simultaneous radially and axially.

7. The transmission shaft assembly as in claim 1, wherein the outer periphery of the sleeve includes external grooves defining the passageway.

8. The transmission shaft assembly as in claim 1, wherein the passageway between the inner periphery of the shaft and the outer periphery of the sleeve is an axially extending passageway.

9. The transmission shaft assembly as in claim 1, wherein at least a portion of the passageway between the inner periphery of the shaft and the outer periphery of the sleeve is a helical passageway.

10. A transmission shaft for a rolling stand for use in a metal rolling mill, comprising:
    a shaft including a generally cylindrical outer periphery and defining a centrally positioned longitudinal opening extending from a first end to an opposed second end of the shaft and defining a plurality of internal passageways therein, and an inner periphery, the centrally positioned longitudinal opening facilitating conveying of fluid between the first end and the opposed second end; and
    a sleeve including an outer periphery thereof fitted to the inner periphery of the shaft, wherein the sleeve is hollow, wherein a space between the inner periphery of the shaft and the outer periphery of the sleeve define the plurality of internal passageways.

11. The transmission shaft as in claim 10, wherein said plurality of internal passageways includes a plurality of radially extending passageways and a plurality of axially extending passageways.

12. The transmission shaft as in claim 10, wherein the passageway between the inner periphery of the shaft and the outer periphery of the sleeve is an axially extending passageway.

13. The transmission shaft as in claim 10, wherein at least a portion of the passageway between the inner periphery of the shaft and the outer periphery of the sleeve is a helical passageway.

14. A method for providing lubrication to a transmission shaft in a rolling mill machine, said method comprises the steps of:
    providing a transmission shaft having a central opening extending to the opposed ends of the shaft and internal passageways extending inwardly from an outer periphery of the shaft, the shaft having an inner periphery, the central opening facilitating conveying of fluid between the opposed ends;
    providing a rotary distributor;
    fitting the distributor over the outer periphery of the shaft;
    inserting a sleeve into the central opening of the shaft, wherein the sleeve is hollow, the sleeve has an outer periphery, wherein the sleeve is hollow, wherein a space between the inner periphery of the shaft and the outer periphery of the sleeve define a plurality of internal passageways;

providing a passageway in the space between the outer periphery of the sleeve and the inner periphery of the shaft;

inputting lubricant into the rotary distributor;

passing lubricant from the distributor to the internal passageways of the shaft; and advancing the lubricant from the internal passageways of the shaft to the opposed ends of the shaft.

15. The method in accordance with claim 14, wherein the step of advancing the lubricant from the internal passageways of the shaft to the opposed ends of the shaft comprises advancing the lubricant along the passageway between the sleeve and a body portion of the shaft.

16. The method in accordance with claim 14, wherein the step of providing a passageway comprises providing a helical passageway between the sleeve and a body portion of the shaft.

\* \* \* \* \*

UNITED STATES PATENT AND TRADEMARK OFFICE
CERTIFICATE OF CORRECTION

| | |
|---|---|
| PATENT NO. | : 11,879,499 B2 |
| APPLICATION NO. | : 16/039425 |
| DATED | : January 23, 2024 |
| INVENTOR(S) | : Adriano Savio et al. |

It is certified that error appears in the above-identified patent and that said Letters Patent is hereby corrected as shown below:

In the Specification

Column 6, Line 59, "S" should be --5--.

Signed and Sealed this
Ninth Day of April, 2024

Katherine Kelly Vidal
*Director of the United States Patent and Trademark Office*